United States Patent [19]

Ryuo et al.

[11] Patent Number: 5,061,855
[45] Date of Patent: Oct. 29, 1991

[54] RADIATION DETECTOR

[75] Inventors: Toshihiko Ryuo, Usuigun; Shinji Makikawa, Annaka; Tatsuo Mori, Annaka, all of Japan

[73] Assignee: Shin-Etsu Chemical Co., Ltd., Tokyo, Japan

[21] Appl. No.: 506,864

[22] Filed: Apr. 9, 1990

[30] Foreign Application Priority Data

Apr. 7, 1989 [JP] Japan .................................... 1-86793

[51] Int. Cl.$^5$ ............................................. G01J 1/58
[52] U.S. Cl. ................................ 250/361 R; 250/368; 250/483.1; 250/486.1; 250/487.1
[58] Field of Search ............. 250/361 R, 483.1, 486.1, 250/487.1, 368

[56] References Cited

U.S. PATENT DOCUMENTS

| | | | |
|---|---|---|---|
| 4,267,453 | 5/1981 | Kieboom et al. | 250/487.1 |
| 4,375,423 | 3/1983 | Cusano et al. | 250/483.1 |
| 4,533,489 | 8/1985 | Utts et al. | 250/487.1 |
| 4,543,485 | 9/1985 | Ishii et al. | 250/487.1 |
| 4,647,781 | 3/1987 | Takagi et al. | 250/483.1 |
| 4,687,683 | 8/1987 | Ichii et al. | 250/487.1 |
| 4,733,088 | 3/1988 | Yamada et al. | 250/483.1 |
| 4,788,436 | 11/1988 | Koechner | 250/381 R |

FOREIGN PATENT DOCUMENTS 0146255  6/1985  European Pat. Off. .

Primary Examiner—Jack I. Berman
Assistant Examiner—Kiet T. Nguyen
Attorney, Agent, or Firm—McAulay Fisher Nissen Goldberg & Kiel

[57] ABSTRACT

By a radiation detector comprising a photomultiplier tube, a $Bi_4Ge_3O_{12}$ crystal of which a face contacted to the photomultiplier tube and reflecting layers which essentially consisting of reflecting powdery agent and an acrylic resin type binder provided on faces other than the face of the crystal, the energy resolution can be made smaller and stable. Thus, the resolution of the detector can be made higher. The detection accuracy can be improved since the energy resolution caused to be reduced and stabilized by raising the thickness of reflecting layers up to 50 μm or more. Furthermore use of an acrylic resin, as a binder for forming the reflecting layers, is effective in eliminating the influence of the silicone-based adhesive agent, which allows to enhance the reflectance and adhesion of the reflecting layers. At the same time, a processing once suffices to build the reflecting layers thus resolving the problem of intricate manufacturing.

6 Claims, 3 Drawing Sheets

5,061,855

RADIATION DETECTOR

BACKGROUND OF THE INVENTION

This invention relates to a radiation detector used in high energy physics or diagnostic radiology such as an X-ray computerized tomographic apparatus (X-ray CT) and a positron emission nuclide tomographic apparatus (positron CT).

A radiation detector having a photomultiplier tube and a scintillator WHICH generates scintillated light from irradiated radiation and then the photons of the light are detected by the photomultiplier tube. The scintillator thus is required to meet the following conditions:

(1) the scintillator should transmit to the photomultiplier tube the maximum of the fluorescence which it generates, and (2) reflecting layers applied to the scintillator should be high in reflectance, stable and exempt from any alteration and discoloration, all over the entire ultraviolet to visible light range. Several types of scintillators satisfying these requirements have so far been commercialized.

One example of such a commercial use is disclosed in Japanese Patent Provisional Publication No. 57-194374. The conventional radiation detector thus disclosed uses, as the $Bi_4Ge_3O_{12}$ crystal (referred to as "BGO crystal"), having reflecting layers of $BaSO_4$ with a binder consisting of polyvinyl alcohol (referred to as "PVA binder").

When forming conventional reflecting layers for a BGO crystal from $BaSO_4$ with PVA binder, the reflectance of the reflecting layers is likely to fluctuate and the reflecting layers frequently exfoliate from the BGO crystal. These disadvantages are caused by permeation of silicone based adhesive material commonly used to adhere the BGO crystal to the photomultiplier tube into the reflecting layers. This permeation reduces the reflectance of the layers and adhesion.

There is another disadvantage in the manufacturing process of conventional reflecting layers. The reflecting layers are made into multiple layers from aqueous solutions of different concentration of PVA mingled with $BaSO_4$ and the respective coating steps makes the process onerous and expensive.

SUMMARY OF THE INVENTION

This invention saves such problematical points, and offers a radiation detector which meets the requirements of the scintillator, improves the reflecting properties and adhesiveness of the reflecting layers and can be readily manufactured.

As a result of the present inventors' intense research and studies to find satisfactory reflecting layers of radiation detectors, the inventors have discovered that the mean particle size of the reflecting agent has a significant influence upon the reflectance of the layers.

The mean particle size of the reflecting agent is not less than 0.8 $\mu$m and that the binder is a polymer type binder.

An acrylic resin is preferred as the polymer type binder.

The thickness of the reflecting layers 3 is preferably 50 $\mu$m or more.

The mean particle sizes of the reflecting agent in the reflecting layers are more than 0.8 $\mu$m so that the reflecting layers enhance the reflectance. This implies that a greater number of photons which reach the photomultiplier tube will have a better energy resolution. If the mean sizes are less than this value, the energy resolution will be increased as described later, which in turn worsens the sensitivity of the radiation detector.

DETAILED DESCRIPTION OF THE INVENTION

Figure 1:
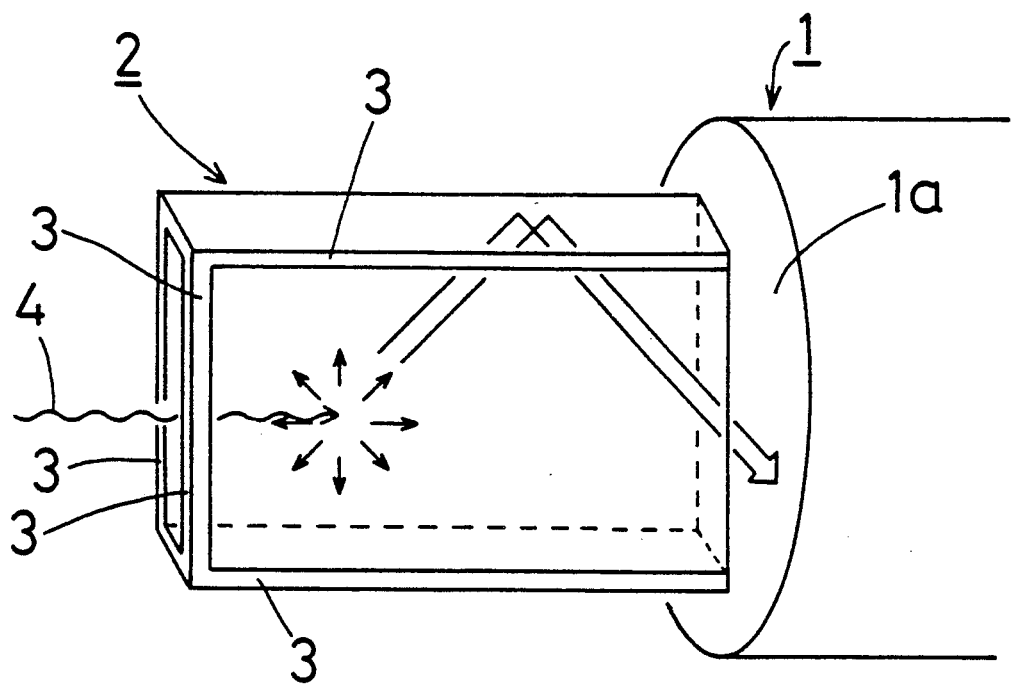
FIG. 1 is a perspective illustration showing a working example of the present invention.

Use of a polymer type binder, more specifically an acrylic resin, as a binder to form the reflecting layers allows to avoid influence of the silicone-based adhesive and to improve the reflectance and adhesion of the reflecting laYers. The thickness of the layers, which is more than 50 $\mu$m, permits the reflecting layer to obtain a sufficiently small energy resolution. If the thickness of the layers is not more than 50 $\mu$m, the scintillation in the BGO crystal leaks through the reflecting layers thereby rendering it impossible to have a sufficiently low energy resolution.

Thus the radiation detector of this invention presents a high enough sensitivity with an energy resolution of 16% or less.

The reflecting agents used are known materials such as, $BaSO_4$, $TiO_2$, $Al_2O_3$, MgO and the like, since the energy resolution increases if the mean particle sizes of these reflecting agents are 0.8 $\mu$m or less. Thus, a size of 0.8 $\mu$m or more or, more preferably 0.8 to 2.5 $\mu$m is chosen.

Use of acrylic resin based synthetic paints as polymer type binders enables the reflection layer to retain the scintillation value of BGO crystal 2 as well as provide excellent adhesion and minimize cracks. It does not permit discoloration of paint film, as is observed with epoxy resins. Use of the silicone-based binder to adhere the BGO crystal 2 onto the photomultiplier tube 1 can avoid permeation of the binder and difficulties with the exfoliation of the reflecting layers 3.

The acrylic resins used are known materials, such as, polyacrylic acid esters: for instance, polymethylacrylate, polyethylacrylate, polybutylacrylate; and emulsions or solutions of copolymers of these esters with acrylonitrile, vinyl acetate, vinyl chloride and the like.

Because the reduction of the energy resolution can be insufficient if the reflecting layers 3 are 50 $\mu$m or less in thickness, this thickness should be not less than 50 $\mu$m, and more preferably, 50 $\mu$m to 200 $\mu$m.

This invention will be understood more easily by referring to the following working examples not limited with illustrations.

In the FIG. 1, 1 represents a photomultiplier tube, 2 represents a $Bi_4Ge_3O_{12}$ crystal in rectangular parallelepiped form (referred to as the BGO crystal) in contact with the entrance window 1a of the photomultiplier tube 1. 3 represents the reflecting layers of the BGO crystal 2 which are provided on faces other than the face contacting the photomultiplier tube 1. The reflecting layers 3 consist of a reflecting agent and a polymer type binder.

One 5×10 mm face of a 5×10×25 mm BGO crystal, was mirror polished and the other 5 faces were rough polished. Thus the BGO crystal 2 as a scintillator was prepared. A paint of a reflecting agent was prepared by mixing one part of volume of liquid dispersion consisting of 1 kg of powdered reflecting agent, 500 g of water and 60 g of 2.6% PVA aqueous solution and another one part by volume of an acrylic type resin (NIPPEI HOME PAINT, a brand of NIPPON PAINT K. K.). This paint was coated on the five rough-polished faces by means of a spray gun. After drying up the coated paint, the reflecting layers 3 were obtained on the 5 faces of the BGO crystal 2. Use of an acrylic type resin as the binder made it possible to have such layers by only a single coating.

Figure 2:
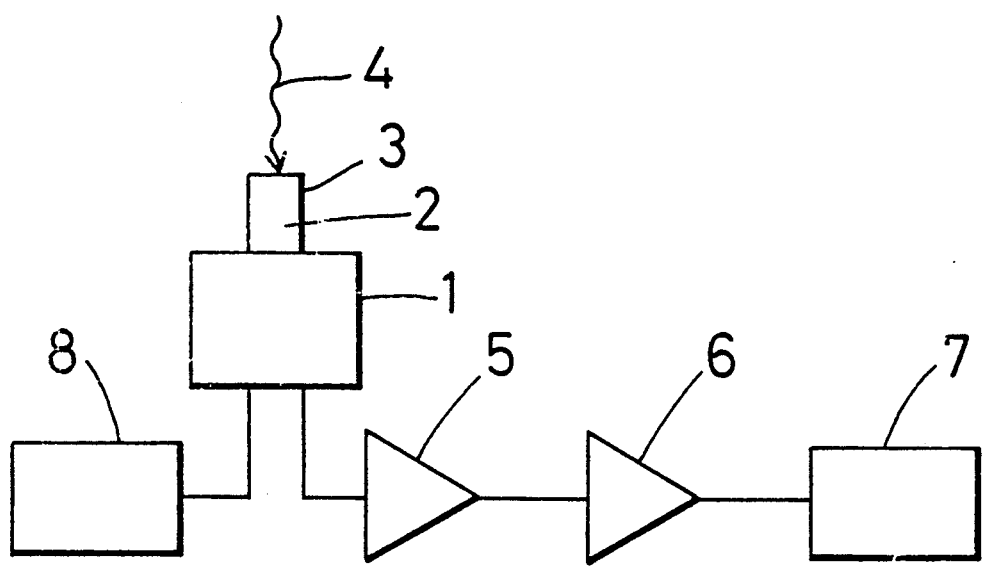
FIG. 2 is a block diagram showing a system of measurement.

The mirror polished face of this BGO crystal 2 was contacted with the photomultiplier tube 1 as shown in FIG. 1. A measuring system for an energy resolution of the above scintillator was made as shown in FIG. 2. The energy resolution of the scintillator was then measured by using the system. The light generated by irradiation of γ-ray 4 onto the BGO crystal 2 was received and converted to a photo-electron beam by photomultiplier tube 1. The photo-electron beam was amplified by the preamplifier 5 and the amplifier 6. Then the number of photons generated was counted up with the counter 7. The number 8 in the figure represents an electric source.

Figure 3:
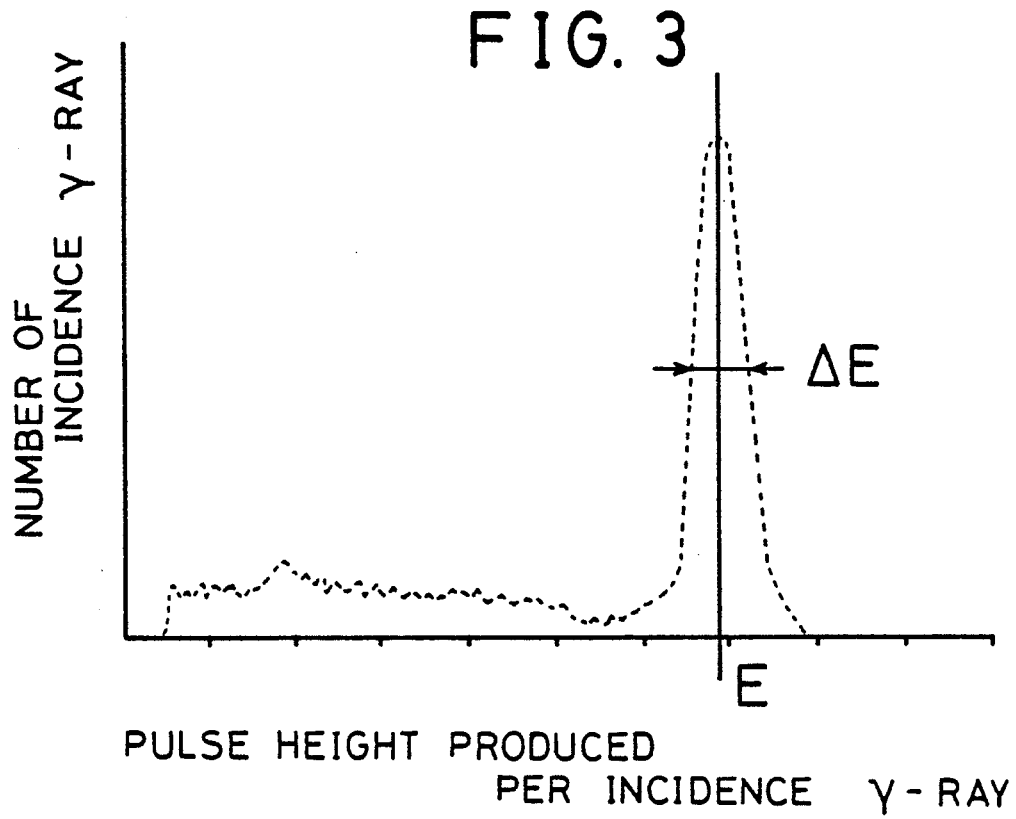
FIG. 3 represents a characteristic curve showing a relationship between a number of incidence $\gamma$-ray and a pulse height generated by the $\gamma$-ray.

As shown in FIG. 3, the pulse height produced per incidence γ-ray was plotted on the coordinate with the pulse height by incidence of the γ-ray taken on an abscissa and the number of the incidence γ-ray on the ordinate. The energy resolution can be calculated in terms of the pulse peak E thus obtained and the half value width ΔE of the peak, from the following formula:

$$\text{Energy resolution} = \Delta E/E \ (\%)$$

Of the lower energy resolutions, the resolution of the γ-ray detector is considered to be higher.

Figure 4:
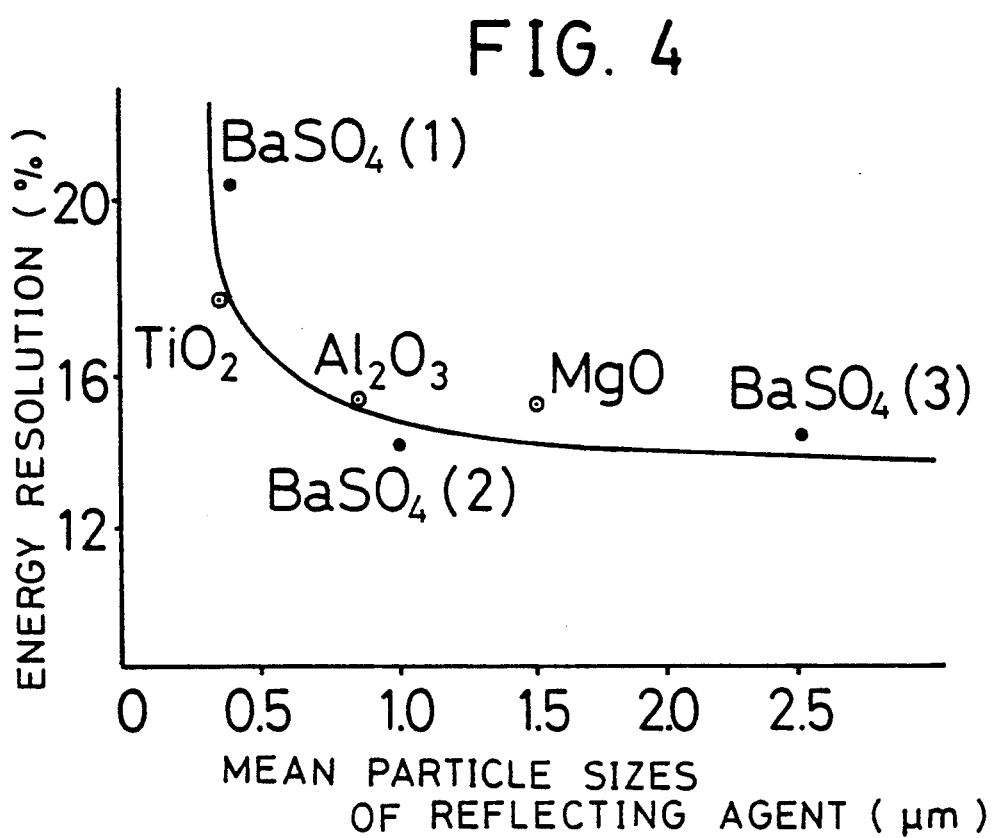
FIG. 4 is a characteristic diagram showing the relationship between mean particle sizes of the reflecting layers and an energy resolution in the working example.

FIG. 4 shows the results of the measurement of this energy resolution using a wide variety of reflecting agents and varying the mean particle size thereof. As is clear from this figure, when the mean size of the agent is 0.8 μm or larger, the energy resolution indicates a value 16% or less, which implies a good luminous efficiency and a stable resolution.

Figure 5:
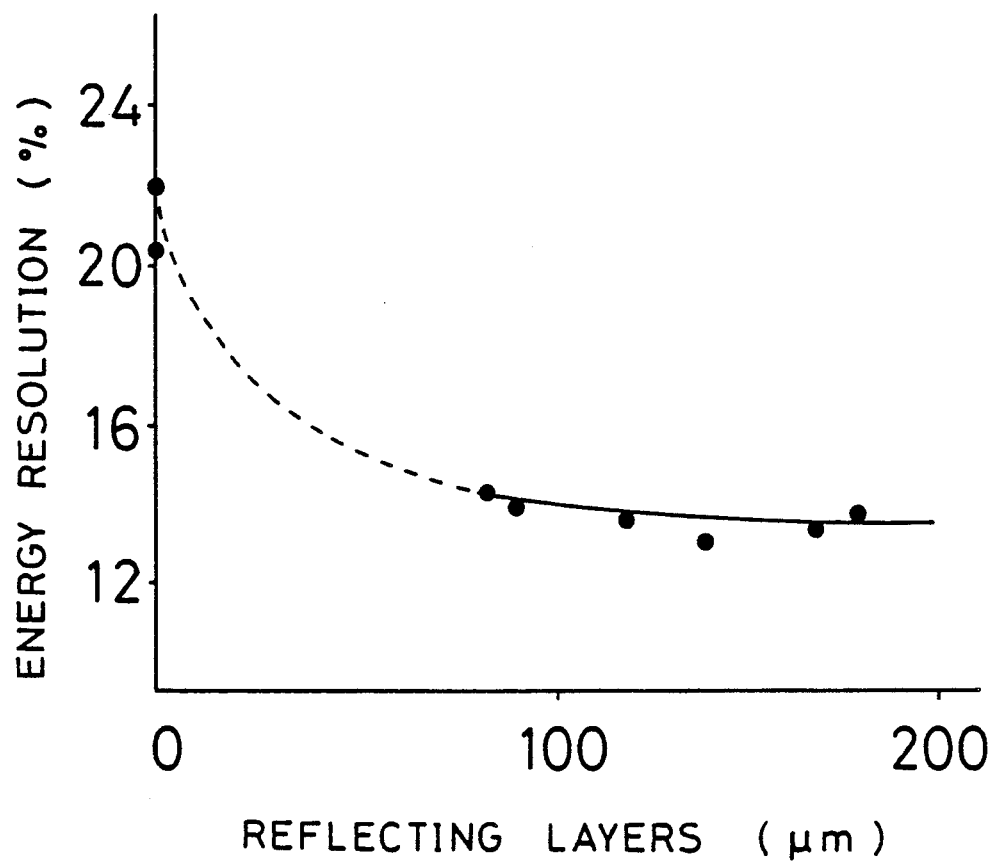
FIG. 5 is another characteristic curve showing the relationship between the thickness of the reflecting layers and the energy resolution in the working example.

FIG. 5 indicates the result of the measurement of energy resolution, made using $BaSO_4$, 1 μm in mean particle size and varying the thickness of the reflecting layers 3. As is seen in this figure, the energy resolution increase if the thickness is less than 50 μm, but it takes a stable value of less than 16% when the thickness is more than 50 μm. It was observed that none of these reflecting layers caused an increase in exfoliation or cracking.

The BGO crystals 2 having the reflecting layers thus obtained were adhered with each other with a commonly used silicone-based adhesive "KE420" (brand of THE SHIN-ETSU CHEMICAL) and then assembled into a radiation detector. No exfoliation of the reflecting layers nor inCreased energy resolution was observed.

For comparison, other reflecting layers were formed with PVA binder to examine their adhesiveness. These reflecting layers were readily exfoliated from the BGO crystal when adhered using a silicone-based binder.

As the explained the above, since the energy resolution of the radiation detector of this invention can be made smaller and stable by using a reflecting agent having a mean particle size of not less than 0.8 μm in the reflecting layer faces the radiation can be detected with high accuracy.

The detection accuracy can be improved because the energy resolution is reduced and stabilized also by raising the thickness of the reflecting layers up to 50 μm or more. Furthermore, using a high polymer binder, and more specifically, acrylic resins, as a binder for forming the reflecting layers, the influence of the silicone-based adhesive agent is eliminated. This allows the reflectance and adhesion of the reflecting layers to be enhanced. At the same time, the reflecting layers can be produced in a single step thus facilitating the manufacture of the detector.

What is claimed is:

1. In a radiation detector having a photomultiplier tube, and a multiface $Bi_4Ge_3O_{12}$ crystal, a face of which contacts the photomultiplier tube and reflecting layers on faces other than the contacting face, the improvement which comprises said contacting face being mirror-polished, said other faces being rough-polished and said reflecting layers containing a reflecting powder agent and a binder containing an acrylic resin and a polyvinyl alcohol.

2. The radiation detector of claim 1 wherein the reflecting powder agent has a mean particle size of greater than 0.8 μm.

3. The radiation detector of claim 1, wherein the reflecting powdery agent has a mean particle size in the range from about 0.8 μm to 2.5 μm.

4. The radiation detector of claim 1 wherein the reflecting powdery agent is selected from the group consisting of $BaSO_4$, $TiO_2$, $Al_2O_3$ and $MgO$.

5. The radiation detector of claim 1 wherein the acrylic resin is selected from the group consisting of polymethymethacrylate, polyethylacrylate, polybutylacrylate, copolymers of polymethacrylate, polyethylacrylate, and polybutylacrylate with acrylonitrile, copolymers of polymethylacrylate, polyethylacrylate, and polybutylacrylate with vinyl acetate and copolymers of polymethylacrylate, polyethylacrylate, and polybutylacrylate with vinyl chloride.

6. The radiation detector of claim 1 wherein the reflecting layer has a thickness of not less than about 50 μm.

* * * * *